July 15, 1941.                 E. C. ROGERS                 2,249,228
                    PHOTOGRAPHIC NEGATIVE CARRIER
                       Filed Dec. 21, 1938          2 Sheets-Sheet 1
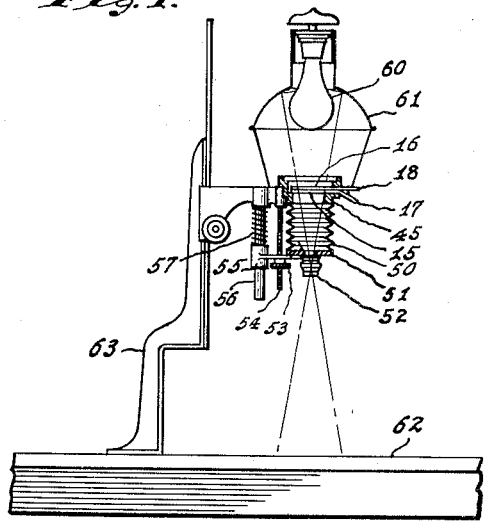
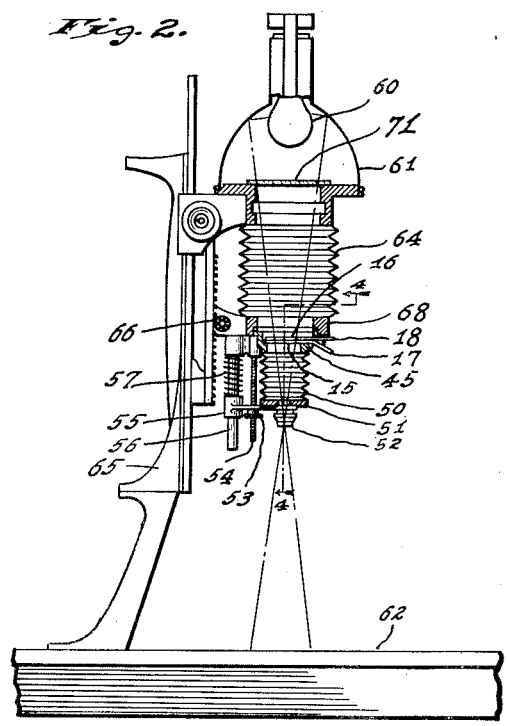
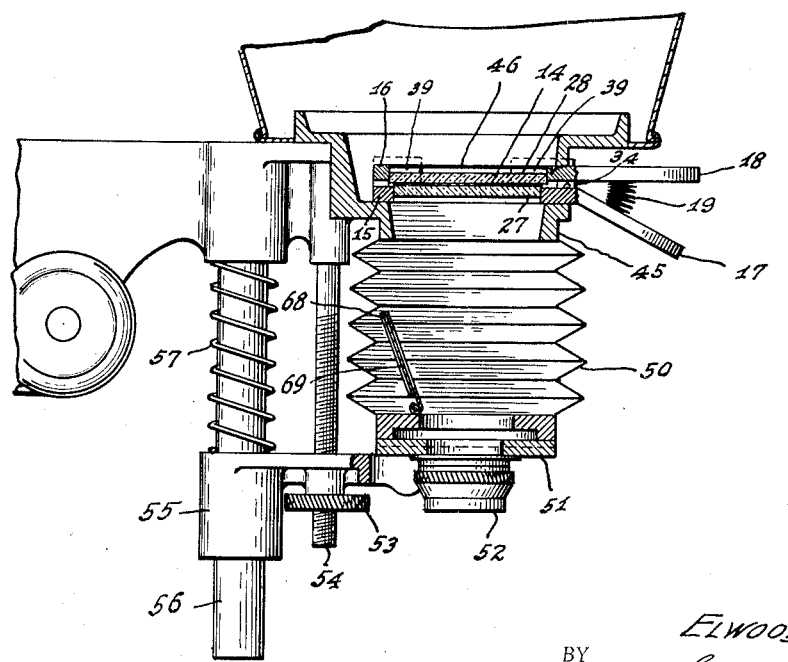
INVENTOR.
ELWOOD C. ROGERS,
BY
ATTORNEYS.

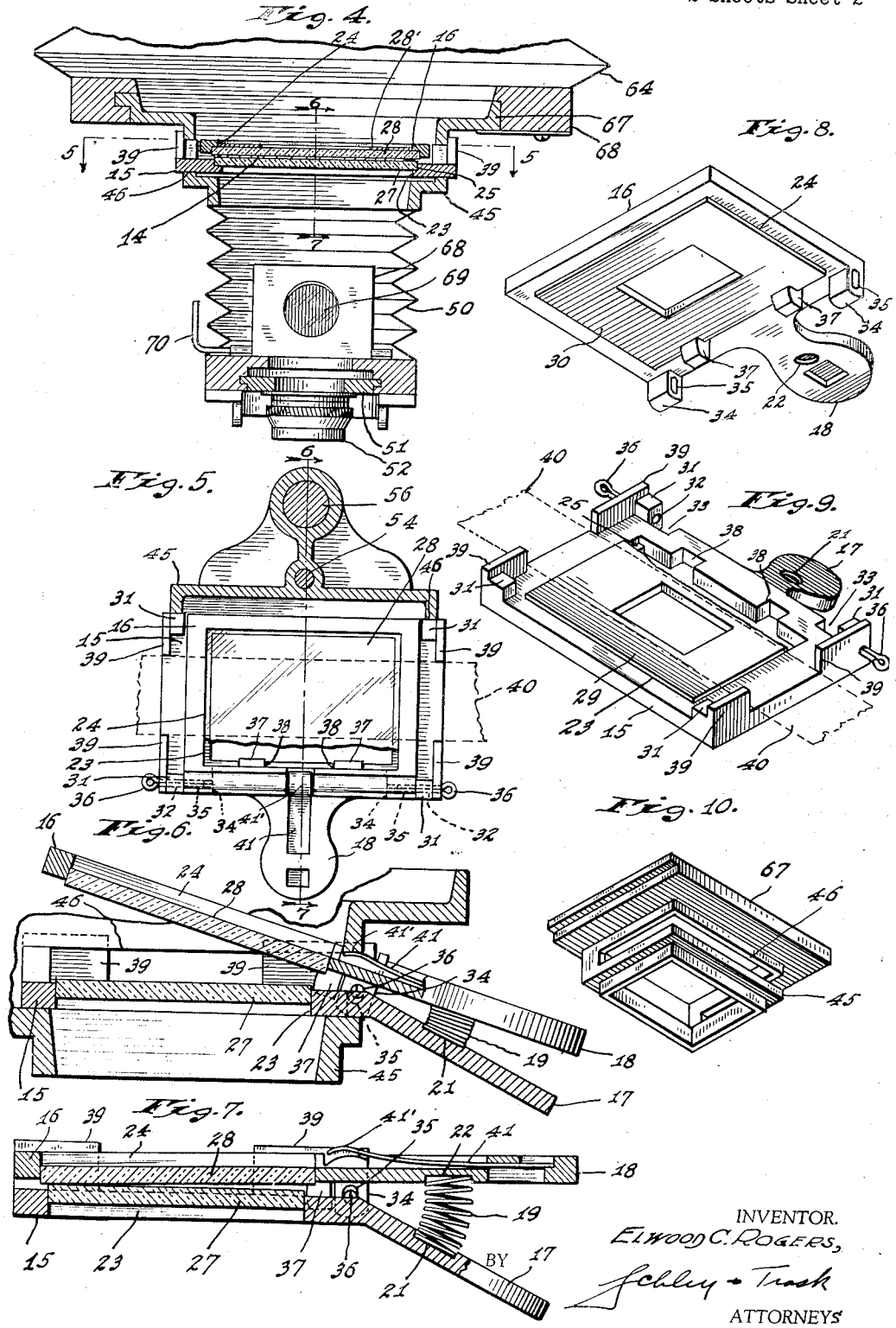

Patented July 15, 1941

2,249,228

UNITED STATES PATENT OFFICE 2,249,228

PHOTOGRAPHIC NEGATIVE CARRIER

Elwood C. Rogers, Indianapolis, Ind.

Application December 21, 1938, Serial No. 246,956

14 Claims. (Cl. 88—24)

It is the object of my invention to provide an effective photographic negative carrier which has both wide adaptability and simple and sure operation; and which is especially suitable for photographic enlargers.

The accompanying drawings illustrate my invention: In these drawings, Fig. 1 is a vertical section through a single-bellows photographic enlarger provided with my negative carrier; Fig. 2 is a vertical section similar to Fig. 1, but through a double-bellows enlarger with my negative carrier located in a plane between the two bellows; Fig. 3 is an enlargement of part of Fig. 1, showing the negative carrier and adjacent parts, and with some features not shown in Fig. 1; Fig. 4 is a vertical section on the line 4—4 of Fig. 2; Fig. 5 is a horizontal section on the line 5—5 of Fig. 4; Figs. 6 and 7 are vertical sections, on a still larger scale, through the negative carrier, on the lines 6—7 of Figs. 4 and 5; Figs. 8 and 9 are isometric views of the upper and lower plates respectively of the negative carrier, taken from below and above respectively; and Fig. 10 is an isometric view of the carrier-support.

The negative carrier for a negative 14 has two plates hinged together, a lower plate 15 (Fig. 9) and an upper plate 16 (Fig. 8), between which the negative 14 is received. These plates are generally rectangular in shape, but are provided with handles or finger-grips 17 and 18 projecting about centrally from the edges at which the hinging is done. The handles 17 and 18 normally flare obliquely from each other, as is shown in Fig. 7, conveniently by having the handle 18 in the plane of its plate 16 and the handle 17 projecting obliquely downward from the plane of the plate 15; and they are pressed apart by a light coiled compression spring 19 having its ends seated in recesses 21 and 22 in the adjacent faces of the handles 17 and 18.

The plates 15 and 16 are both hollow rectangles, so that in effect they are frames around rectangular light-transmitting openings 23 and 24. The rectangular opening 24 in the upper plate 16 is desirably slightly larger than the opening 23 in the lower plate 15, and has all four of its sides set back slightly from the corresponding sides of the opening in the lower plate, as is clear from Fig. 5, to avoid shadows from the converging light rays which pass downward through the two openings. At their ends, the openings 23 and 24 are provided on their adjacent faces with rabbets 25; to receive glass plates 27 and 28 (Figs. 3–7), or alternatively opaque (metal or wood) mask-plates 29 and 30 with smaller openings of any desired size through them (Figs. 9 and 8). Desirably the depths of the rabbets 25 are slightly less than the thickness of the received plates, so that those received plates will surely engage and exert pressure on any negative put between them. Those received plates are thus pressure plates; and whether they are the glass plates 27 and 28 or the opaque mask-plates 29 and 30, may be suitably held in place, as by cement or by a friction fit. When the glass plates 27 and 28 are the pressure plates, a supplemental mask-plate 28′, of opaque material with a central opening through it of desired size and shape, may lie on top of the glass plate 28 within the opening 24, as is shown in Fig. 4. That mask-plate 28′ remains safely in place throughout the tiltings (hereinafter described) of the plate 16. This mask-plate 28′ is thus close to the negative, so that it is close to the focus and defines a sharp outline; but it does not touch the negative or interfere with it, so that it permits the negative to be held firmly between the pressure plates.

The two plates 15 and 16 are of substantially the same width externally, as is clear from Figs. 6 and 7; but the lower plate 15 is longer externally than is the upper plate 16, and projects beyond it at both ends, as is clear from Figs. 4 and 5. At each projecting corner the lower plate 15 is provided with an upstanding boss 31 about as high as the upper plate 16 is thick, so that the upper faces of the bosses are about flush with the upper face of the upper plate 16 when the two plates 15 and 16 are together as shown in Fig. 7.

The upper plate 16 is located between the bosses 31 at one end and those at the other. The two bosses 31 at the hinge edge are the hinge-bosses, and are provided with hinge-pin holes 32 centered substantially on the meeting plane of the glass plates 27 and 28. At its hinge edge, the lower plate 15 is provided with notches 33 next to the hinge-bosses 31; and the upper plate 16 has hinge-bosses 34 which lie in the notches 33 in line with the hinge-bosses 31 and are provided with hinge-pin holes 35 in line with the hinge-pin holes 32. At least one set of the hinge-pin holes 32 and 35, the holes 35 as shown, are widened transversely to the plane of the associated plate, to permit play of the plates 15 and 16 toward and from each other on the hinge-pins 36; so that the compression spring 19 not only tends to move the non-hinge edges of the plates together, but also to separate slightly (as far as the widened holes 35 permit) the hinge edges of those plates, as is clear from Fig. 7. The hinge-pins 36 are conveniently simple cotter-pins with their two fingers slightly sprung apart; as they permit ready removal but tend to stay in place against accidental dropping out, and yet permit the desired relative movement between the plates 15 and 16.

The upper plate 16 is desirably provided with two positioning lugs 37 which extend downward from the hinge-adjacent part of that upper plate 16 into and have a loose fit in notches 38 provided in the hinge-adjacent edge of the opening 23 in the lower plate 15. These positioning lugs 37 are engaged by a negative thrust between the opened plates 15 and 16 (Fig. 6), and so locate that negative. To make this location more accurate, the negative-engaging faces of those positioning lugs are curved in an arc having the hinge-axis as its center.

The lower plate 15 has at its ends upstanding guide-flanges 39, which project slightly higher than the bosses 31. These guide-flanges 39 desirably do not extend entirely across the ends of the lower plate 15, but are cut away at the middle to leave openings through which a strip 40 of photographic film may extend. This permits sliding the strip 40 through the negative carrier to bring any picture of the strip into the field of the enlarger, as determined by the central openings in the mask-plates 29 and 30, without requiring more than a very slight separation of the plates 15 and 16.

The handle 18 of the upper plate 16 has a leaf-spring 41 mounted in a groove on its upper surface and anchored to that handle near its outer end but free at its inner end and extending across the hinge-axis provided by the hinge-pins 36. The inner free end of that leaf spring is convex upwardly, so that it slants downward both ways from its high point 41'; and that high point is on the side of the hinge axis which is away from the handle 18, and is higher than the upper surface of the upper plate 16 when the leaf-spring 41 is unsprung, as is shown in Fig. 7. The leaf-spring is sufficiently stiff so that when its high point is sprung down by the upper face of the slot 46 toward or into the plane of that upper surface it is more powerful than and overcomes the light coiled compression spring 19, and forces the hinge-edges of the two plates 15 and 16 toward each other, as permitted by the widened hinge-pin holes 35 and as shown in Fig. 3. In that condition the two springs 19 and 41 co-operate to make the mating upper and lower plates engage each other or grip an interposed negative 14 or strip 40 on both ends and both sides of the light-transmitting opening, instead of standing apart at the hinge-edges (as shown in Fig. 7) as they do when the spring 19 is expanded and the spring 41 is unsprung.

The negative carrier as so far described is a unit which may be slipped into and withdrawn from a photographic device, such as an enlarger. To that end it co-operates with a rectangular supporting box 45 forming part of that photographic device. The supporting box 45 is open at top and bottom, and is provided with a horizontal slot 46 which extends the full length of one side and continues almost completely across both ends. The width (height) of that slot 46 is slightly greater, enough for clearance, than the thickness of the lower plate 15 at the bosses 31, and so than the combined thickness of the assembled plates 15 and 16; and the outer length of the box 45 is just less than the clear distance between the guide-flanges 39 at the two ends of the lower plate 15. This permits the negative carrier to be inserted into and withdrawn from the slot 46, with the guide-flanges 39 overlapping the ends of the box 45, and the lower face of the lower plate 15 engaging and resting on the lower face of the slot 46, and the upper faces of the lugs 31 engaging the upper face of that slot 46. In addition, when the negative carrier is slipped into the slot 46, the free end of the leaf-spring 41 engages and is depressed by the upper face of the slot 46, resiliently to push the two plates 15 and 16 bodily together, so that they may adjust themselves to the thickness of any interposed negative 14 or photographic strip 40. With the negative carrier thus in place, the handle 18 may be depressed, if desired, to tilt the upper plate 16 upward within the box 45, as is shown in Fig. 6; as to permit a photographic strip 40 to be inserted or withdrawn, or to be moved lengthwise to shift one of its pictures out of the field and another into the field provided by the openings in mask-plates 29 and/or 30, without withdrawing the negative carrier as a whole. For single negatives 14, however, the negative carrier is withdrawn from the box 45, and the negative 14 taken out or inserted; in which insertion the positioning lugs 37 locate an edge of such negative.

The box 45 has a bellows 50 extending downward from it, and at the lower end of that bellows 50 there is a lens-board 51 carrying a lens 52. That lens-board 51 may be adjusted toward or from the box 45 by a nut 53 on a screw 54 fixed on the box 45 and extending through the lens-board; and is guided in its movements and held parallel to the box 45 by having a slide 55 slidable on a slide-rod 56 also fixed on the box 45. A light compression spring 57 desirably tends to push the slide 55 and lens-board 51 downward, so that the nut 53 merely raises them against such spring 57 or permits the spring and gravity to lower them.

Above the box 45 is a lamp 60 and a reflector 61, from which light rays pass downward through the negative 14 or photographic strip 40 to impinge upon any desired light-sensitive device (paper, film, or plate) on a table 62, on which light-sensitive device the desired photographic enlargement is made. The lamp 60 and reflector 61 may be fixed with relation to the box 45, as is shown in Fig. 1. In that case there is only the one bellows 50; and the focusing is done by moving the box 45 and lamp and reflector as a unit vertically on a standard 63, and by the nut 53. If desired, however, the box 45 may be movable with respect to the lamp 60 and reflector 61, as is shown in Fig. 2. In that case there is a second bellows 64 interposed between the box 45 and the reflector 61, the whole structure may be adjusted vertically on a standard 65, the box 45 and the parts carried by it may be adjusted vertically relatively to the lamp 60 and reflector 61 by a rack and pinion 66, and the lens-board 51 and lens 52 may be adjusted vertically relatively to the box 45 by the nut 53. In the latter construction, the box 45 is desirably hung from a board 67 (Fig. 10) which is removably mounted in a block 68 at the lower end of the bellows 64, and which is interchangeable in such mounting with other devices, such as a lens-board of ordinary construction.

If desired, the lens plate 51 may carry a tiltable plate 68 having a color filter 69, such as a ruby glass or film, swingable by a handle 70 into and out of color-filtering position over the lens 52. In addition, a diffusing plate 71, as of ground glass, may be insertable between the lamp 60 and the negative carrier, to shut off or modify the light.

I claim as my invention:

1. A photographic negative carrier, comprising two plates hinged together to grip a negative between them, the hinge between said two plates having widened enclosed hinge-pin holes to permit the two plates movement toward and from each other transversely of the hinge axis but to limit that movement, spring means normally tending to cause such movement of the plates from each other, and means on said carrier adapted to engage a portion of an enlarger and overcome such tendency when said negative carrier is in position in such enlarger.

2. A photographic negative carrier, comprising two plates hinged together to grip a negative between them, the hinge between said two plates having widened hinge-pin holes to permit the two plates movement toward and from each other transversely of the hinge axis, said two plates having separated operating handles projecting from their hinge edges to move the two plates relatively to each other around their hinge axis, and a spring acting between said handles and tending both to separate said two operating handles and to move the two plates apart transversely of said hinge axis.

3. A photographic negative carrier, comprising two plates hinged together to grip a negative between them, the hinge between said two plates having widened hinge-pin holes to permit the two plates movement toward and from each other transversely of the hinge axis, and a spring acting between said plates and tending both to swing said plates together around said hinge axis and to move them apart transversely of said hinge axis.

4. A photographic negative carrier, comprising two plates hinged together to grip a negative between them, the hinge between said two plates having widened hinge-pin holes to permit the two plates movement toward and from each other transversely of the hinge axis, a spring acting between said plates and tending both to swing said plates together around said hinge axis and to move them apart transversely of said hinge axis, and a second normally inactive spring which when made active opposes and overcomes the first spring as to said transverse movement but assists the first spring to swing the two plates together around said hinge axis.

5. In combination with a negative carrier as set forth in claim 4, a supporting box having a slot in which said negative carrier is insertable and withdrawable, said second spring being arranged to be made active by the insertion of said negative carrier into said slot.

6. In combination with a negative carrier as set forth in claim 3, a supporting box having a slot in which said negative carrier is insertable and withdrawable, and a leaf spring mounted on one of said plates and arranged to be sprung by inserting the negative carrier into said slot and when sprung tending to press the two plates together.

7. A negative carrier, comprising two plates hinged together, one of said plates having lugs between which the other plate lies and also having positioning flanges, in combination with a supporting box having a slot in which said negative carrier is insertable and removable, said lugs being arranged to engage a face of the slot and said flanges to engage faces of said box to locate the negative carrier when it is inserted into the slot.

8. A negative carrier, comprising two plates hinged together, one of said plates having lugs between which the other plate lies, in combination with a supporting box having a slot in which said negative carrier is insertable and removable, said lugs being arranged to engage a face of the slot to locate the negative carrier when it is inserted into the slot.

9. A negative carrier, comprising two plates hinged together, one of said plates having lugs between which the other plate lies and also having positioning flanges, in combination with a supporting box having a slot in which said negative carrier is insertable and removable, said lugs being arranged to engage a face of the slot and said flanges to engage faces of said box to locate the negative carrier when it is inserted into the slot, the walls of said box being arranged to permit the plates to be swung apart about their hinge axis when the carrier is in said slot.

10. A negative carrier, comprising two plates hinged together, one of said plates having lugs between which the other plate lies, in combination with a supporting box having a slot in which said negative carrier is insertable and removable, said lugs being arranged to engage a face of the slot to locate the negative carrier when it is inserted into the slot, the walls of said box being arranged to permit the plates to be swung apart about their hinge axis when the carrier is in said slot.

11. A negative carrier, comprising two plates hinged together, one of said plates having lugs between which the other plate lies, in combination with a supporting box having a slot in which said negative carrier is insertable and removable, said lugs being arranged to engage a face of the slot to locate the negative carrier when it is inserted into the slot, said lugs being spaced apart to provide spaces at both ends of the negative carrier through which a photographic strip is slidable.

12. A photographic negative carrier, comprising two plates co-operating to grip a negative between them, a spring tending to press those plates together at at least one point along one edge of the negative, and a second and lighter spring tending to press the two plates apart at that edge of the negative but to press them together at at least one point at the opposite edge of the negative.

13. In combination with a negative carrier as set forth in claim 3, a supporting box having a slot in which said negative carrier is insertable and withdrawable, and a spring which acts between said box and said negative carrier and which is arranged to be sprung by inserting the negative carrier into said slot and which when so sprung tends to press the two plates together.

14. In combination, a photographic negative carrier comprising two plates hinged together to grip a negative between them, the hinge between said two plates having widened enclosed hinge-pin holes to permit the two plates movement toward and from each other transversely of the hinge axis but to limit that movement, spring means normally tending to cause such movement of the plates from each other, a holder for the negative carrier, and means adapted to overcome said plate-separating tendency when the negative carrier is in position in said holder.

ELWOOD C. ROGERS.